(12) United States Patent
Brown et al.

(10) Patent No.: US 12,441,647 B2
(45) Date of Patent: Oct. 14, 2025

(54) METHODS AND APPARATUS FOR MANUFACTURING A GLASS RIBBON

(71) Applicant: CORNING INCORPORATED, Corning, NY (US)

(72) Inventors: James William Brown, The Villages, FL (US); Pierre Georges Brunello, Villecerf (FR); Nils Paul Fornell, Harrodsburg, KY (US); Misha Andre Gerschel, Skillman, NJ (US); Keith Mitchell Hill, Horseheads, NY (US); Mark Thomas Massaro, Murray, KY (US); Gary Edward Merz, Rochester, NY (US); Stephane Poissy, Brunoy (FR)

(73) Assignee: CORNING INCORPORATED, Corning, NY (US)

( * ) Notice: Subject to any disclaimer, the term of this patent is extended or adjusted under 35 U.S.C. 154(b) by 152 days.

(21) Appl. No.: 18/251,643

(22) PCT Filed: Nov. 17, 2021

(86) PCT No.: PCT/US2021/059625
§ 371 (c)(1),
(2) Date: May 3, 2023

(87) PCT Pub. No.: WO2022/115281
PCT Pub. Date: Jun. 2, 2022

(65) Prior Publication Data
US 2024/0002272 A1    Jan. 4, 2024

Related U.S. Application Data

(60) Provisional application No. 63/117,722, filed on Nov. 24, 2020.

(51) Int. Cl.
*C03C 23/00*     (2006.01)
*C03B 33/023*    (2006.01)
(Continued)

(52) U.S. Cl.
CPC ........ *C03B 33/0235* (2013.01); *C03B 33/033* (2013.01); *C03B 33/037* (2013.01); *C03B 35/188* (2013.01)

(58) Field of Classification Search
CPC .......... C03B 33/00; C03B 33/02; C03B 33/03
See application file for complete search history.

(56) References Cited

U.S. PATENT DOCUMENTS 7,717,254 B2    5/2010  Brackley et al.
8,584,489 B2   11/2013  Chang et al.
(Continued)

FOREIGN PATENT DOCUMENTS

CN    103269989 A    8/2013
CN    109311718 A    2/2019
(Continued)

OTHER PUBLICATIONS

International Search Report and Written Opinion of the International Searching Authority; PCT/US2021/059625; mailed on Mar. 1, 2022, 14 pages; European Patent Office.
(Continued)

*Primary Examiner* — Erin Snelting
*Assistant Examiner* — Steven S Lee
(74) *Attorney, Agent, or Firm* — Kevin M. Able; F. Brock Riggs

(57) ABSTRACT

Methods for manufacturing a glass ribbon include moving the glass ribbon along a travel path in a travel direction. Methods include directing a first ribbon portion of the glass ribbon to a winding apparatus to wind the first ribbon portion into a roll. Methods include detaching the first ribbon
(Continued)

portion from a second ribbon portion of the glass ribbon. Methods include separating the second ribbon portion into a plurality of separated ribbon portions. Methods include directing a first set of the plurality of separated ribbon portions toward a disposal apparatus to crush the first set of the plurality of separated ribbon portions. Methods include forming a stack with a second set of the plurality of separated ribbon portions. A glass manufacturing apparatus is provided.

10 Claims, 8 Drawing Sheets

(51) Int. Cl.
    *C03B 33/033*     (2006.01)
    *C03B 33/037*     (2006.01)
    *C03B 35/18*     (2006.01)

(56) References Cited

U.S. PATENT DOCUMENTS

| | | |
|---|---|---|
| 9,132,964 B2 | 9/2015 | Cavallaro, III et al. |
| 9,199,816 B2 | 12/2015 | Blanding et al. |
| 2012/0017642 A1* | 1/2012 | Teranishi ............ B32B 17/10 65/273 |
| 2012/0159989 A1* | 6/2012 | Shiraishi ............ C03B 35/188 65/169 |
| 2013/0126576 A1 | 5/2013 | Marshall et al. |
| 2015/0099618 A1* | 4/2015 | Bisson ............ C03B 17/061 65/25.2 |
| 2015/0218034 A1* | 8/2015 | Bigelow ............ B26D 7/18 156/271 |
| 2015/0259236 A1* | 9/2015 | Marshall ............ B65H 18/103 225/2 |
| 2015/0299019 A1* | 10/2015 | Fujii ............ C03B 33/082 65/165 |
| 2015/0321943 A1 | 11/2015 | Chang et al. |
| 2016/0107857 A1 | 4/2016 | Merz et al. |
| 2016/0137543 A1* | 5/2016 | Abramov ............ C03B 33/0235 225/2 |
| 2016/0152433 A1 | 6/2016 | Merz et al. |
| 2017/0157917 A1* | 6/2017 | Young ............ B05C 3/125 |
| 2017/0158547 A1 | 6/2017 | Dannoux et al. |
| 2017/0349471 A1 | 12/2017 | Boratav et al. |
| 2018/0100698 A1* | 4/2018 | DeMartino ............ B29C 41/12 |
| 2018/0134600 A1* | 5/2018 | Morhauser ............ C03B 19/09 |
| 2018/0134605 A1 | 5/2018 | Aburada et al. |
| 2018/0141847 A1* | 5/2018 | Booth ............ C03B 35/246 |
| 2018/0141848 A1 | 5/2018 | Aburada et al. |
| 2018/0362388 A1* | 12/2018 | Bayne ............ B65G 49/065 |
| 2019/0194055 A1* | 6/2019 | Mori ............ C03B 33/0235 |
| 2019/0352115 A1* | 11/2019 | Mori ............ B65H 23/28 |
| 2019/0389759 A1 | 12/2019 | Aburada et al. |

FOREIGN PATENT DOCUMENTS

| | | | |
|---|---|---|---|
| CN | 110382425 A * | 10/2019 | ............ B23K 26/08 |
| EP | 3297961 A1 | 3/2018 | |
| JP | 2015-044713 A | 3/2015 | |
| JP | 2016518262 A * | 6/2016 | ............ C03B 33/074 |
| JP | 2018-150155 A | 9/2018 | |
| JP | 3224453 U * | 12/2019 | ............ C03B 33/091 |
| TW | 201429895 A * | 8/2014 | ............ B28D 1/28 |
| WO | WO-2011064931 A1 * | 6/2011 | ............ B28D 1/28 |
| WO | WO-2012090766 A1 * | 7/2012 | ............ C03B 1/02 |
| WO | WO-2015029669 A1 * | 3/2015 | ............ C03B 33/0215 |
| WO | WO-2016123000 A1 * | 8/2016 | ............ C03B 33/0235 |
| WO | 2016/187173 A1 | 11/2016 | |
| WO | 2019/244653 A1 | 12/2019 | |

OTHER PUBLICATIONS

Taiwanese Patent Application No. 110143762, Office Action dated Mar. 10, 2025, 2 pages (English Translation only), Taiwanese Patent Office.

* cited by examiner

METHODS AND APPARATUS FOR MANUFACTURING A GLASS RIBBON

CROSS-REFERENCE TO RELATED APPLICATIONS

This is a national stage application under 35 U.S.C. § 371 of International Application No.: PCT/US2021/059625 filed on Nov. 17, 2021, which claims the benefit of priority under 35 U.S.C. § 119 of U.S. Provisional Application Ser. No. 63/117,722 filed on Nov. 24, 2020, the content of which is relied upon and incorporated herein by reference in its their entireties.

FIELD

The present disclosure relates generally to methods for manufacturing a glass ribbon and, more particularly, to methods for manufacturing a glass ribbon with a glass manufacturing apparatus comprising a catenary apparatus.

BACKGROUND

It is known to manufacture molten material into a glass ribbon with a glass manufacturing apparatus. The glass ribbon can be stored by winding the glass ribbon into a roll with a winding apparatus. However, as a thickness of the glass ribbon decreases, the glass ribbon may experience sag during transport to the winding apparatus.

SUMMARY

The following presents a simplified summary of the disclosure to provide a basic understanding of some embodiments described in the detailed description.

In some embodiments, a glass manufacturing apparatus can comprise a catenary apparatus that can guide a glass ribbon from a forming apparatus. The catenary apparatus can be positioned upstream from a winding apparatus. As the glass ribbon travels along the catenary apparatus, the glass ribbon can be guided to the winding apparatus such that the glass ribbon can be wound onto a spool of the winding apparatus in a roll. The catenary apparatus may also comprise a scoring apparatus that can cause portions of the glass ribbon to separate into separated ribbon portions. The separated ribbon portions can be delivered to a conveyor, wherein the separated ribbon portions can be disposed. In some embodiments, instead of delivering the separated ribbon portions to the conveyor, the separated ribbon portions can be collected from the catenary apparatus and stored, for example, in a stack of separated ribbon portions. As such, the glass manufacturing apparatus can comprise a plurality of paths along which the glass ribbon can travel.

In accordance with some embodiments, methods for manufacturing a glass ribbon can comprise moving the glass ribbon along a travel path in a travel direction. Methods can comprise directing a first ribbon portion of the glass ribbon to a winding apparatus to wind the first ribbon portion into a roll. Methods can comprise detaching the first ribbon portion from a second ribbon portion of the glass ribbon. Methods can comprise separating the second ribbon portion into a plurality of separated ribbon portions. Methods can comprise directing a first set of the plurality of separated ribbon portions toward a disposal apparatus to crush the first set of the plurality of separated ribbon portions. Methods can comprise forming a stack with a second set of the plurality of separated ribbon portions.

In some embodiments, methods can comprise moving a conveyor between a first position outside the travel path of the glass ribbon and a second position intersecting the travel path.

In some embodiments, methods can comprise delivering the plurality of separated ribbon portions to the conveyor when the conveyor is in the second position and moving the plurality of separated ribbon portions toward an end of the conveyor.

In some embodiments, methods can comprise delivering the plurality of separated ribbon portions to the conveyor when the conveyor is in the second position and moving the plurality of separated ribbon portions toward an end of the conveyor.

In some embodiments, the disposal apparatus can be positioned adjacent to the end of the conveyor such that the first set of the plurality of separated ribbon portions are directed from the end into the disposal apparatus.

In some embodiments, the first ribbon portion can be directed to the winding apparatus when the conveyor is in the first position.

In some embodiments, a segment of the first ribbon portion upstream from the winding apparatus can be unsupported and spaced a distance from the disposal apparatus when the conveyor is in the first position.

In some embodiments, methods can comprise measuring the distance between the segment of the first ribbon portion and a location within a clean room environment within which the first ribbon portion is located.

In some embodiments, methods can comprise adjusting a rotational speed of the winding apparatus when the distance is outside of a predetermined range.

In accordance with some embodiments, methods for manufacturing a glass ribbon can comprise moving the glass ribbon along a travel path in a travel direction. Methods can comprise directing a first ribbon portion of the glass ribbon along a first path portion of the travel path to a winding apparatus to wind the first ribbon portion into a roll. Methods can comprise detaching the first ribbon portion from a second ribbon portion of the glass ribbon. Methods can comprise moving a conveyor from a first position outside the first path portion to a second position intersecting the first path portion, to receive the second ribbon portion. Methods can comprise separating the second ribbon portion into a plurality of separated ribbon portions. Methods can comprise delivering the plurality of separated ribbon portions to the conveyor.

In some embodiments, methods can comprise directing a first set of the plurality of separated ribbon portions from the conveyor toward a disposal apparatus.

In some embodiment, methods can comprise forming a stack with a second set of the plurality of separated ribbon portions.

In accordance with some embodiments, a glass manufacturing apparatus can comprise a forming apparatus configured to form a glass ribbon. The glass manufacturing apparatus can comprise a catenary apparatus positioned downstream from the forming apparatus and comprising a curved surface. The curved surface can comprise a travel path along which the glass ribbon is conveyed in a travel direction. The glass manufacturing apparatus can comprise a winding apparatus positioned downstream from the catenary apparatus and configured to wind a first ribbon portion of the glass ribbon into a roll. The glass manufacturing apparatus can comprise a conveyor positioned downstream from the catenary apparatus and configured to receive a plurality of separated ribbon portions of a second ribbon portion of the glass ribbon from the catenary apparatus and move the plurality of separated ribbon portions along a portion of the travel path.

In some embodiments, the glass manufacturing apparatus can comprise a plurality of rollers forming the curved surface. The plurality of rollers can extend along a width of the glass ribbon perpendicular to the travel direction.

In some embodiments, the glass manufacturing apparatus can comprise a scoring apparatus positioned on an opposite side of the travel path from the plurality of rollers.

In some embodiments, the plurality of rollers can comprise air bearings that can emit air toward the travel path.

In some embodiments, the glass manufacturing apparatus can comprise a support roller positioned between the forming apparatus and the catenary apparatus. The support roller can engage a first major surface of the glass ribbon and the catenary apparatus can engage a second major surface of the glass ribbon.

In some embodiments, the glass manufacturing apparatus can comprise a disposal apparatus positioned downstream from the conveyor. The disposal apparatus can receive a first set of the plurality of separated ribbon portions from the conveyor and crush the first set of the plurality of separated ribbon portions.

In some embodiments, the glass manufacturing apparatus can comprise a sensor that can measure a distance between a segment of the first ribbon portion and a location within a clean room environment within which the first ribbon portion is located.

In some embodiments, the glass manufacturing apparatus can comprise a control apparatus connected to the sensor and the winding apparatus. The control apparatus can adjust a rotational speed of the winding apparatus based on the distance measured by the sensor.

Additional features and advantages of the embodiments disclosed herein will be set forth in the detailed description that follows, and in part will be clear to those skilled in the art from that description or recognized by practicing the embodiments described herein, including the detailed description which follows, the claims, as well as the appended drawings. It is to be understood that both the foregoing general description and the following detailed description present embodiments intended to provide an overview or framework for understanding the nature and character of the embodiments disclosed herein. The accompanying drawings are included to provide further understanding and are incorporated into and constitute a part of this specification. The drawings illustrate various embodiments of the disclosure, and together with the description explain the principles and operations thereof.

BRIEF DESCRIPTION OF THE DRAWINGS

These and other features, embodiments and advantages are better understood when the following detailed description is read with reference to the accompanying drawings, in which.

DETAILED DESCRIPTION

Figure 1:
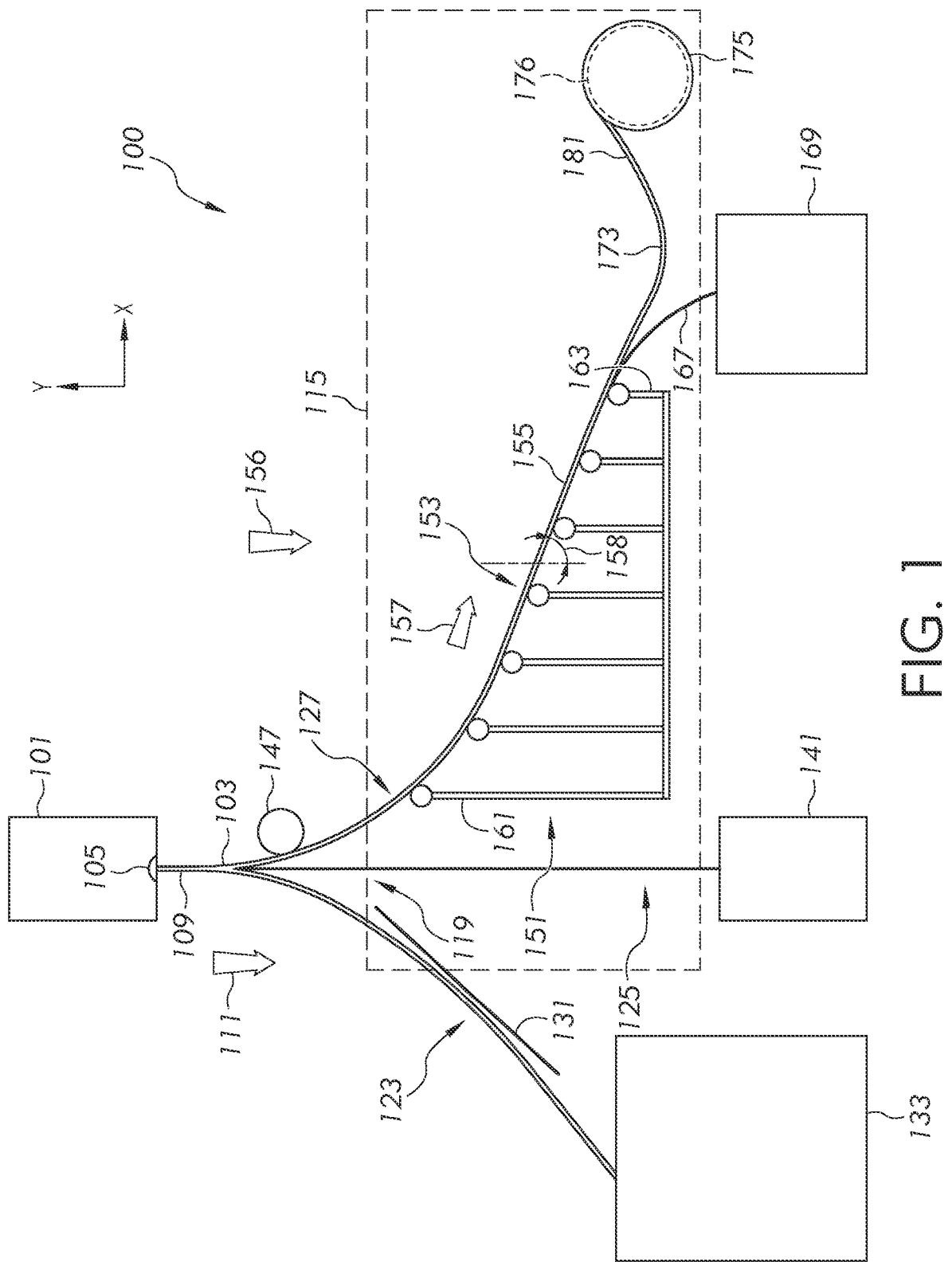
FIG. 1 schematically illustrates example embodiments of a glass manufacturing apparatus in accordance with embodiments of the disclosure.

Embodiments will now be described more fully hereinafter with reference to the accompanying drawings in which example embodiments are shown. Whenever possible, the same reference numerals are used throughout the drawings to refer to the same or like parts. However, this disclosure may be embodied in many different forms and should not be construed as limited to the embodiments set forth herein.

As used herein, the term "about" means that amounts, sizes, formulations, parameters, and other quantities and characteristics are not, and need not be, exact, but may be approximate and/or larger or smaller, as desired, reflecting tolerances, conversion factors, rounding off, measurement error and the like, and other factors known to those of skill in the art.

Ranges can be expressed herein as from "about" one value, and/or to "about" another value. When such a range is expressed, another embodiment includes from the one value to the other value. Similarly, when values are expressed as approximations by use of the antecedent "about," it will be understood that the value forms another embodiment. It will be further understood that the endpoints of each of the ranges are significant both in relation to the other endpoint, and independently of the other endpoint.

Directional terms as used herein—for example up, down, right, left, front, back, top, bottom, upper, lower, etc.—are made only with reference to the figures as drawn and are not intended to imply absolute orientation.

Unless otherwise expressly stated, it is in no way intended that any method set forth herein be construed as requiring that its steps be performed in a specific order, nor that with any apparatus, specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural references unless the context clearly dictates otherwise. Thus, for example, reference to "a" component includes aspects having two or more such components, unless the context clearly indicates otherwise.

The word "exemplary," "example," or various forms thereof are used herein to mean serving as an example, instance, or illustration. Any aspect or design described herein as "exemplary" or as an "example" should not be construed as preferred or advantageous over other aspects or designs. Furthermore, examples are provided solely for purposes of clarity and understanding and are not meant to limit or restrict the disclosed subject matter or relevant portions of this disclosure in any manner. It can be appreciated that a myriad of additional or alternate examples of varying scope could have been presented but have been omitted for purposes of brevity.

As used herein, the terms "comprising" and "including", and variations thereof, shall be construed as synonymous and open-ended, unless otherwise indicated. A list of elements following the transitional phrases comprising or including is a non-exclusive list, such that elements in addition to those specifically recited in the list may also be present.

The terms "substantial," "substantially," and variations thereof as used herein are intended to represent that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

Modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first end and a second end generally correspond to end A and end B or two different or two identical ends or the same end.

The present disclosure relates to a glass manufacturing apparatus and methods for manufacturing a glass ribbon. For purposes of this application, "glass ribbon" may be considered one or more of a glass ribbon in a viscous state, a glass ribbon in an elastic state (e.g., at room temperature) and/or a glass ribbon in a viscoelastic state between the viscous state and the elastic state. Methods and apparatus for forming a glass ribbon will now be described by way of example embodiments. For purposes of the disclosure, in some embodiments, a glass manufacturing apparatus can comprise a glass forming apparatus that forms a glass article (e.g., a glass ribbon) from a quantity of molten material. In some embodiments, the glass ribbon can be employed in a variety of display applications comprising, but not limited to, liquid crystal displays (LCDs), electrophoretic displays (EPD), organic light emitting diode displays (OLEDs), plasma display panels (PDPs), touch sensors, photovoltaics, foldable phones, etc.

As schematically illustrated in FIG. 1, in some embodiments, an exemplary glass manufacturing apparatus 100 can comprise a forming apparatus 101 configured to form a glass ribbon 103. In some embodiments, the forming apparatus 101 can comprise a slot draw apparatus, float bath apparatus, down-draw apparatus, up-draw apparatus, press-rolling apparatus, or other glass forming apparatus that forms a glass ribbon. In some embodiments, the forming apparatus 101 can comprise a delivery conduit through which the glass ribbon 103 can exit the forming apparatus 101. For example, in some embodiments, the delivery conduit can comprise a passageway with an opening 105. In some embodiments, the opening can comprise a non-circular shape, such as an elongated shape in which one dimension (e.g., a width) may be greater than another dimension (e.g., a length) such that the glass ribbon 103 can comprise a flattened shape in which the width is greater than the thickness. In some embodiments, the delivery conduit can be oriented along a direction of gravity, such that the glass ribbon 103 can flow downwardly along the direction of gravity through the delivery conduit.

In some embodiments, the forming apparatus 101 can define an upstream portion of a travel path 109 extending in a first travel direction 111. The forming apparatus 101 can convey the glass ribbon 103 along the upstream portion of the travel path 109 in the first travel direction 111. In some embodiments, the forming apparatus 101 can be positioned at an exterior of a clean room environment 115, with one or more portions of the glass manufacturing apparatus 100 positioned within the clean room environment 115. The clean room environment 115 can be contained within one or more walls (e.g., illustrated with dashed lines in FIG. 1) and may comprise a reduced level of particulates (e.g., dust, airborne organisms, vaporized particles, etc.) as compared to a level of particulates at an exterior of the clean room environment 115. In some embodiments, the clean room environment 115 may be maintained at a positive pressure relative to an exterior of the clean room environment 115 such that air may flow from the clean room environment 115 to an environment exterior to the clean room environment 115. In some embodiments, a pressure differential between the clean room environment 115 and the exterior environment may be about 5 pascals or more. Accordingly, the pressure within the clean room environment 115 may be about 5 pascals or more greater than the pressure within the exterior environment. In some embodiments, the clean room environment 115 can comprise an ISO ("International Organization for Standardization") 6 clean room.

In some embodiments, the glass ribbon 103 can enter the clean room environment 115 through an opening 119, for example, in a ceiling of the clean room environment 115. As the glass ribbon 103 enters the clean room environment 115, the glass ribbon 103 can be directed along one or more travel paths, for example, a first travel path 123, a second travel path 125, and a third travel path 127. In some embodiments, the first travel path 123 can include a diverter 131. The diverter 131 can comprise, for example, a surface, such as a planar or non-planar surface, that can guide the glass ribbon 103 along the first travel path 123. For example, as the glass ribbon 103 enters the clean room environment 115, the glass ribbon 103 can be directed to move along the first travel path 123 on the diverter 131. In some embodiments, the diverter 131 can terminate adjacent a first disposal apparatus 133. The glass ribbon 103 can move along the first travel path 123 and into the first disposal apparatus 133, such that the glass ribbon 103 can be crushed within the first disposal apparatus 133. In some embodiments, the first disposal apparatus 133 and some, or all, of the diverter 131 may be located outside the clean room environment 115. For example, the diverter 131 can extend through an opening in a wall forming the clean room environment 115 such that the crushing of the glass ribbon 103 in the first disposal apparatus 133 can occur outside the clean room environment 115. By positioning the first disposal apparatus 133 at the exterior of the clean room environment 115, the likelihood of glass particles entering the clean room environment 115 from the first disposal apparatus 133 can be limited. In some embodiments, as the glass ribbon 103 travels along the first travel path 123 on the diverter 131, an operator can inspect and/or perform tests on the glass ribbon 103. For example, an operator can determine dimensions (e.g., a thickness, a width, etc.) of the glass ribbon 103, a shape of the glass ribbon 103, inspect the glass ribbon 103 for the presence of any imperfections within the glass ribbon 103, etc.

In some embodiments, the glass ribbon 103 can be directed along the second travel path 125 that may be non-parallel to the first travel path 123 and/or the third travel path 127. For example, the second travel path 125 can be substantially parallel to a direction of gravity (e.g., downward in FIG. 1). In some embodiments, the second travel path 125 can be coplanar with the travel path 109 along which the glass ribbon 103 travels as the glass ribbon 103 passes from the forming apparatus 101 into the clean room environment 115. In some embodiments, the glass ribbon 103 can travel along the second travel path 125 under the influence of gravity. The second travel path 125 may terminate adjacent to a second disposal apparatus 141 such that the glass ribbon 103 can move along the second travel path 125 and into the second disposal apparatus 141, whereupon the glass ribbon 103 can be crushed within the second disposal apparatus 141. In some embodiments, the second disposal apparatus 141 may be located outside the clean room environment 115. For example, the second travel path 125 can extend through an opening in a wall forming the clean room environment 115 such that the crushing of the glass ribbon 103 in the second disposal apparatus 141 can occur outside the clean room environment 115. By positioning the second disposal apparatus 141 outside the clean room environment 115, the likelihood of glass particles entering the clean room environment 115 from the second disposal apparatus 141 can be limited.

In some embodiments, the glass ribbon 103 can be directed along the third travel path 127 that may be non-parallel to the first travel path 123 and/or the second travel path 125. For example, the second travel path 125 can be located between the first travel path 123 and the third travel path 127. The third travel path 127 may extend within the clean room environment 115. In some embodiments, the third travel path 127 may be defined by a catenary apparatus 151 that can convey the glass ribbon 103. For example, the catenary apparatus 151 can be positioned downstream from the forming apparatus 101 relative to the first travel direction 111 and may comprise a curved surface 153 that includes a first path portion 155 of the third travel path 127 along which the glass ribbon 103 is conveyed in a second travel direction 157. In some embodiments, the glass manufacturing apparatus 100 can comprise a support roller 147 that may be positioned between the forming apparatus 101 and the catenary apparatus 151. The support roller 147 can engage a first major surface 148 of the glass ribbon 103 and the catenary apparatus 151 can engage a second major surface 149 of the glass ribbon 103. The support roller 147 can facilitate the engagement of the glass ribbon 103 by the catenary apparatus 151. For example, as the glass ribbon 103 travels along the catenary apparatus 151, the glass ribbon 103 can be sandwiched between the support roller 147 (e.g., at an upstream side) and the catenary apparatus 151 (e.g., at a downstream side) such that the glass ribbon 103 can travel along the first path portion 155. The support roller 147 can extend along an axis and may rotate at a rotational speed that substantially matches a travel speed of the glass ribbon 103. As such, the support roller 147 can guide the glass ribbon 103 toward the catenary apparatus 151. In some embodiments, the support roller 147 can comprise a substantially circular cross-sectional shape with a diameter that may be within a range from about 70 millimeters ("mm") to about 90 mm. In some embodiments, the support roller 147 may comprise a contactless support structure, for example, an air bearing that may not contact the glass ribbon 103. Rather, the air bearing may be spaced a distance apart from the glass ribbon 103 and may emit air toward the glass ribbon 103. The air bearing may therefore guide the glass ribbon 103 by applying a force to the glass ribbon 103 via the emitted air.

The catenary apparatus 151 can comprise a plurality of rollers that form the curved surface 153 along which the glass ribbon 103 can travel. The catenary apparatus 151 can extend between a first end 161 and a second end 163. The first end 161 may be located in proximity to and below the forming apparatus 101 such that the first end 161 may initially receive the glass ribbon 103. The curved surface 153 can be angled relative to the ground such that the catenary apparatus 151 can comprise a higher elevation at the first end 161 than at the second end 163. Accordingly, the first path portion 155 may be angled downwardly from the first end 161 toward the second end 163 such that as the glass ribbon 103 travels along the first path portion 155, the glass ribbon 103 can move downwardly from the first end 161 toward the second end 163. For example, by being angled downwardly from the first end 161, the first path portion 155 may be non-horizontal and may be non-parallel and non-perpendicular to a direction of gravity 156. In some embodiments, the first path portion 155 can form an angle 158 relative to the direction of gravity 156 that may be within a range from about 0 degrees to about 90 degrees, or within a range from about 15 degrees to about 75 degrees, or within a range from about 30 degrees to about 60 degrees, etc.

In some embodiments, upon exiting the catenary apparatus 151 at the second end 163, the glass ribbon 103 can travel along one of a plurality of travel paths. For example, the glass ribbon 103 can move along a second path portion 167 of the third travel path 127 toward a third disposal apparatus 169. Alternatively, in some embodiments, the glass ribbon 103 can move along a third path portion 173 of the third travel path 127 toward a winding apparatus 175. For example, a first ribbon portion 181 of the glass ribbon 103 can travel along the third path portion 173 toward the winding apparatus 175, whereupon the first ribbon portion 181 can be wound into a roll. As such, the winding apparatus 175 can be positioned downstream from the catenary apparatus 151 and can wind the first ribbon portion 181 of the glass ribbon 103 into a roll. The winding apparatus 175 can comprise, for example, a spool 176 that may comprise a substantially circular cross-sectional shape. The spool 176 can receive the first ribbon portion 181, whereupon the first ribbon portion 181 can be wound around the spool 176 and into the roll.

Figure 2:
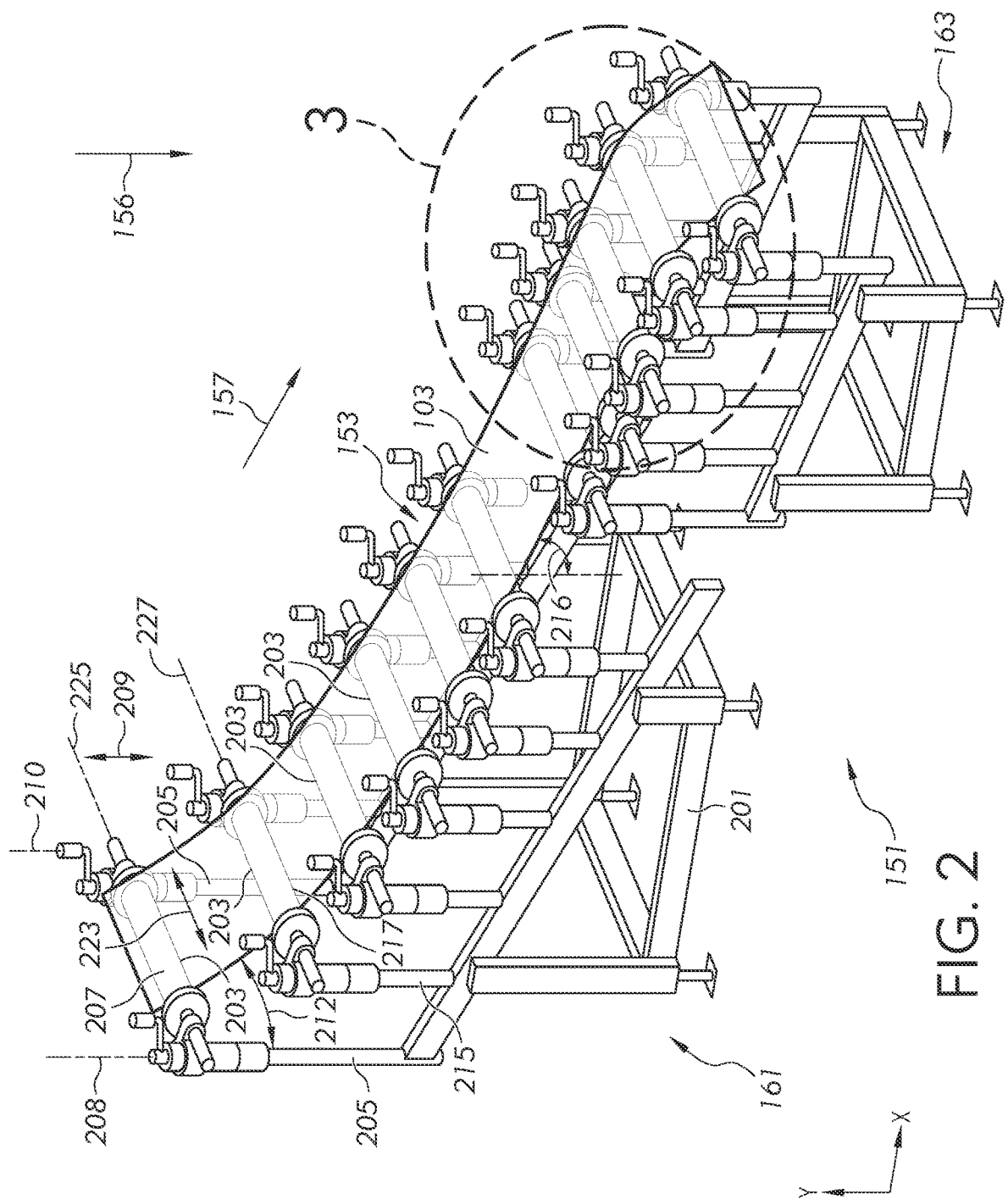
FIG. 2 illustrates a perspective view of a catenary apparatus of the glass manufacturing apparatus in accordance with embodiments of the disclosure.

Referring to FIG. 2, a perspective illustration of the catenary apparatus 151 is provided. In some embodiments, the catenary apparatus 151 can comprise a support structure 201 and a plurality of rollers 203. The support structure 201 can support the plurality of rollers 203 such that the plurality of rollers 203 can form the curved surface 153. For example, the support structure 201 can comprise a first pair of support arms 205 that can support a first roller 207. A first end of the first roller 207 can be attached to one of the first pair of support arms 205 and an opposing second end of the first roller 207 can be attached to another of the first pair of support arms 205. In some embodiments, the first pair of support arms 205 can be vertically adjustable, for example, along a first direction 209 that may be parallel to the direction of gravity 156 and angled relative to the curved surface 153. For example, by being angled relative to the curved surface 153, the first pair of support arms 205 can extend along axes, for example, a first arm axis 208 and a second arm axis 210. In some embodiments, the curved surface 153 can form an angle 212 relative to the axes 208, 210 of the first pair of support arms 205 (e.g., and, thus, the direction of gravity 156) that may be within a range from about 0 degrees to about 90 degrees, or within a range from about 15 degrees to about 75 degrees, or within a range from about 30 degrees to about 60 degrees, etc. By being vertically adjustable along the first direction 209, the first pair of support arms 205 can raise or lower the first roller 207, which can change the angle 212 of the curved surface 153 relative to the axes 208, 210 of the first pair of support arms 205 (e.g., and, thus, the direction of gravity 156) adjacent to the first pair of support arms 205. In some embodiments, the support structure 201 can comprise a second pair of support arms 215 that can support a second roller 217. A first end of the second roller 217 can be attached to one of the second pair of support arms 215 and an opposing second end of the second roller 217 can be attached to another of the second pair of support arms 215. In some embodiments, the second pair of support arms 215 can be vertically adjustable, for example, along the first direction 209. The support structure 201 can comprise additional support arms and rollers that may be spaced apart along a length of the catenary apparatus 151 in the second travel direction 157. The other rollers of the plurality of rollers 203 may be substantially identical to the first roller 207 and the second roller 217. By being spaced apart along the length of the catenary apparatus 151, the first support arms 205 may be spaced a distance apart from the second support arms 215, such that the first roller 207 and the second roller 217 can be spaced the distance apart. In some embodiments, the other support arms and rollers may be spaced apart from the second support arms 215 and the second roller 217 along the second travel direction 157. In some embodiments, the second roller 217 may be at a different elevation than the first roller 207, for example, with the second roller 217 at a lower elevation than the first roller 207. As such, the glass ribbon 103 can first contact the catenary apparatus 151 at the first roller 207 prior to contacting the second roller 217. The catenary apparatus 151 can move the glass ribbon 103 from a substantially vertical orientation (e.g., at a location upstream from the catenary apparatus 151 that may be parallel to the direction of gravity 156) to a non-vertical orientation. The substantially vertical orientation of the glass ribbon 103 can comprise an orientation in which a longitudinal axis of the glass ribbon 103 extends parallel to the direction of gravity 156, and/or an orientation in which a width of the glass ribbon 103 may be vertical (e.g., extending parallel to the direction of gravity 156).

In some embodiments, the plurality of rollers 203 can extend along a width 223 of the glass ribbon 103 that is substantially perpendicular to the travel direction (e.g., the second travel direction 157) along which the glass ribbon 103 travels when the glass ribbon 103 is supported by the catenary apparatus 151. By extending along the width, axes of the plurality of rollers 203 (e.g., a first axis 225 of the first roller 207, a second axis 227 of the second roller 217, etc.) can lie perpendicular to the second travel direction 157 of the glass ribbon 103 and may be parallel to a major surface (e.g., a first major surface or a second major surface) of the glass ribbon 103. In some embodiments, the width 223 of the plurality of rollers 203 may be greater than a width of the glass ribbon 103 such that the glass ribbon 103 can be supported at opposing edges of the glass ribbon 103 and at a central portion of the glass ribbon 103 between the opposing edges.

In some embodiments, the curved surface 153 of the catenary apparatus 151 can comprise a non-constant slope from the first end 161 toward the second end 163. For example, the catenary apparatus 151 can facilitate a change in orientation of the glass ribbon 103 relative to a direction of gravity. At the first end 161 (e.g., between the first roller 207 and the second roller 217) of the catenary apparatus 151, the curved surface 153 can comprise a first slope that is steeper than a slope of the curved surface 153 at other locations along the catenary apparatus 151 between the first end 161 and the second end 163. For example, at a first location that is adjacent to the first end 161 at the first roller 207, the curved surface 153 can form the angle 212 relative to the direction of gravity 156. At a second location that is downstream location from the first end 161 relative to the second travel direction 157 (e.g., wherein a distance separating the second location from the second end 163 is less than a distance separating the first location from the second end 163), the curved surface 153 can form a second angle 216 relative to the direction of gravity 156. In some embodiments, the angle 212 may be different than the second angle 216. For example, in some embodiments, the angle 212 may be within a range from about 30 degrees to about 60 degrees, and the second angle 216 may be within a range from about 65 degrees to about 90 degrees. As such, the angle 212 may be less than the second angle 216 such that the curved surface 153 may comprise an orientation (e.g., relative to the direction of gravity 156) that may be more vertically oriented at the first end 161 and less vertically oriented away from the first end 161 relative to the second travel direction 157. In some embodiments, the slope of a point (e.g., or location) of the curved surface 153 between the first end 161 and the second end 163 is equal to a slope of a straight line that is tangent to the curved surface 153 at that point. The slope of the straight line can be determined by the rise (e.g., the change in vertical distance along the y-direction or direction of gravity 156) divided by the run (e.g., the change in horizontal distance along the x-direction that is perpendicular to the direction of gravity 156). As such, a first end slope of the curved surface 153 at the first end 161 of the catenary apparatus 151 may be steeper than a mid-point slope at a midpoint of the curved surface 153 between the first end 161 and the second end 163. In some embodiments, the first end slope of the curved surface 153 at the first end 161 of the catenary apparatus 151 may be steeper than a second end slope at the second end 163 of the curved surface 153 near the second end 163. Accordingly, the catenary apparatus 151 can receive the glass ribbon 103 when the glass ribbon 103 is in a substantially vertical orientation (e.g., substantially parallel to the direction of gravity) and gradually re-orient the glass ribbon 103 to a position that is closer to a horizontal orientation (e.g., substantially perpendicular to the direction of gravity). Due to the slope change in the curved surface 153, a stress imparted by the catenary apparatus 151 to the glass ribbon 103 may be reduced, which can reduce the likelihood of damage to the glass ribbon 103. In some embodiments, the curved surface 153 can comprise a chain shape, which comprises the shape of a chain between two points (e.g., the curve that a hanging cable or chain assumes under the weight of the cable or chain when supported at opposing ends). The curved surface 153 can substantially match the natural shape of the glass ribbon 103 as the glass ribbon 103 is suspended in a non-vertical orientation. In some embodiments, as a result of the shape of the curved surface 153, the glass ribbon 103 may be supported by the plurality of rollers 203. As such, the likelihood of one roller supporting the glass ribbon 103 and an adjacent roller not supporting the glass ribbon 103 may be reduced, thus reducing a localized stress imparted by the rollers on the glass ribbon 103.

Figure 3:
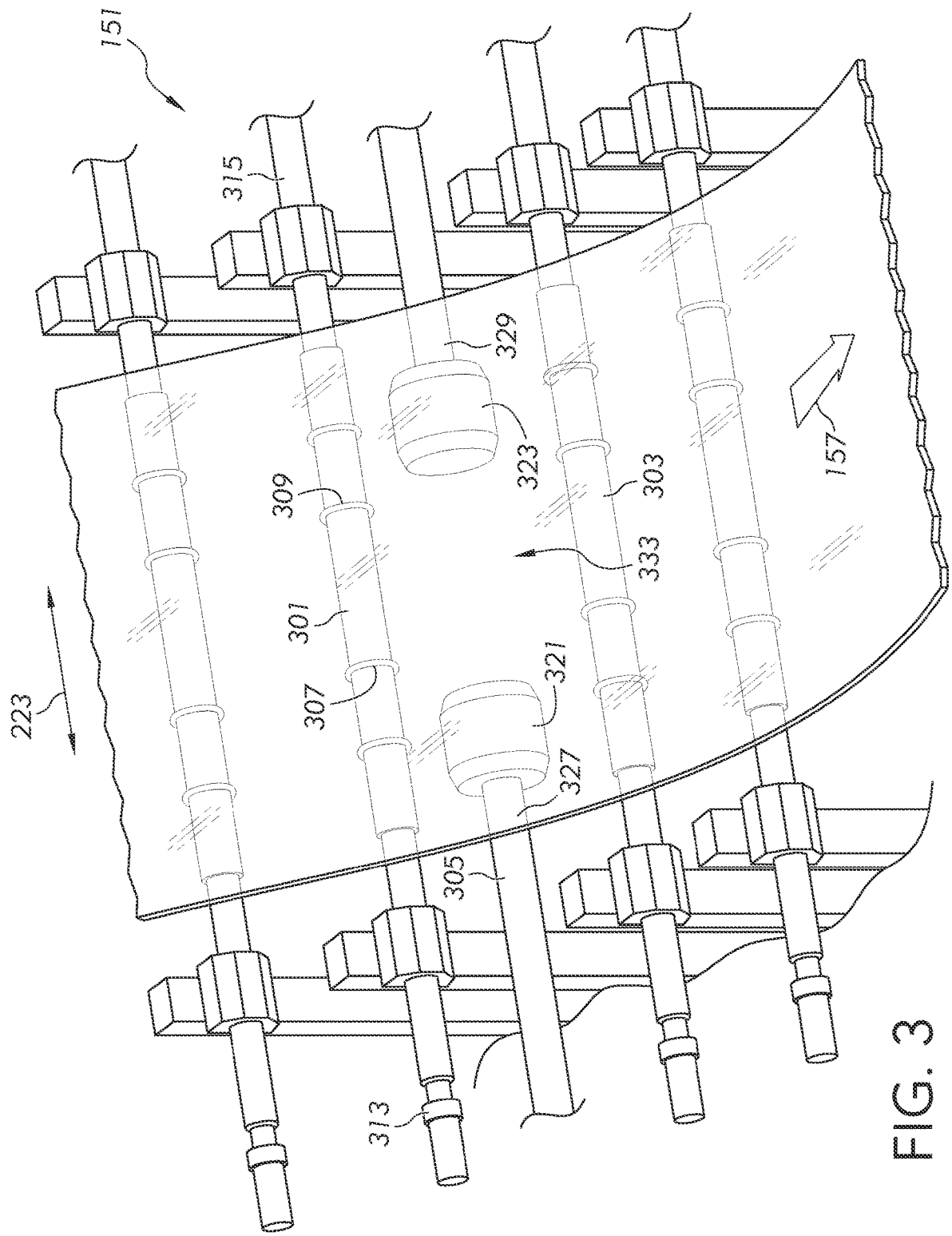
FIG. 3 illustrates an enlarged portion of the catenary apparatus taken at view 3 of FIG. 2 in accordance with embodiments of the disclosure.

Referring to FIG. 3, a perspective view of some of the plurality of rollers 203 is illustrated taken at view 3 of FIG. 2. In some embodiments, the plurality of rollers 203 can comprise a third roller 301, a fourth roller 303, and a fifth roller 305. The third roller 301 and the fourth roller 303 may be substantially identical to the first roller 207 and the second roller 217, but positioned at a different location of the catenary apparatus 151, with the first roller 207 and the second roller 217 located adjacent to the first end 161 and the third roller 301 and the fourth roller 303 located adjacent to the second end 163. In some embodiments, the plurality of rollers 203 can comprise one or more support rings that extend circumferentially around an outer surface of the plurality of rollers 203. For example, referring to the third roller 301, the third roller 301 can comprise one or more support rings, for example, a first support ring 307 and a second support ring 309. The support rings 307, 309 can comprise several types of material that can limit damage to the glass ribbon 103. For example, the support rings 307, 309 can comprise an elastomeric ring (e.g., an elastomeric O-ring) that extends around the third roller 301. The third roller 301 (e.g., and the plurality of rollers 203) can comprise a circular cross-sectional shape such that when the support rings 307, 309 extend around the third roller 301, the support rings 307, 309 can also comprise a circular cross-sectional shape. In some embodiments, a diameter of the support rings 307, 309 may be larger than a diameter of the third roller 301 such that the support rings 307, 309 can rest upon and protrude radially outwardly from an outer surface of the third roller 301. As such, when the glass ribbon 103 is supported by the catenary apparatus 151, the glass ribbon 103 may engage and contact the support rings 307, 309 and not the outer surface of the third roller 301. In some embodiments, the support rings 307, 309 can be spaced apart along a length of the third roller 301. For example, a distance separating the first support ring 307 from a first end 313 of the third roller 301 may be less than a distance separating the second support ring 309 from the first end 313. In some embodiments, a distance separating the second support ring 309 from a second end 315 of the third roller 301 may be less than a distance separating the first support ring 307 from the second end 315.

In some embodiments, the first support ring 307 and the second support ring 309 can contact and support the glass ribbon 103 while allowing the glass ribbon 103 to move relative to the third roller 301. For example, the third roller 301 (e.g., and the plurality of rollers 203) may be rotatable such that as the glass ribbon 103 contacts the support rings 307, 309, the glass ribbon 103 can move in the second travel direction 157 as the third roller 301 rotates. The support rings 307, 309 may be spaced apart such that the glass ribbon 103 may contact the support rings 307, 309 while not contacting and being spaced apart from the outer surface of the third roller 301. For example, based on a thickness of the glass ribbon 103, the glass ribbon 103 may experience sag. The sag may comprise a downward bulging or sinking (e.g., downward relative to the direction of gravity 156) due to the weight of the glass ribbon 103. For example, a first location of the glass ribbon 103 may be supported (e.g., by one of the support rings 307, 309) while an adjacent second location of the glass ribbon 103 may be unsupported. As a result of the second location being unsupported, the glass ribbon 103 may sag at the second location and curve downwardly (e.g., toward the ground) under the influence of gravity. The first support ring 307 and the second support ring 309 can contact the glass ribbon 103 and maintain the glass ribbon 103 at a distance apart from the outer surface of the third roller 301. Due to the material of the support rings 307, 309, the support rings 307, 309 may reduce the likelihood of damage to the glass ribbon 103. For example, the support rings 307, 309 can comprise an elastomeric material (e.g., silicone, or other organic materials) that may be heat resistant up to, for example, about 300 degrees Celsius. As such, the support rings 307, 309 can contact the glass ribbon 103 while avoiding negative effects (e.g., degradation, wear, etc.) due to the heat of the glass ribbon 103.

In some embodiments, the glass ribbon 103 can comprise a thickness between the first major surface and the second major surface that is within a range from about 30 micrometers (e.g., microns) to about 100 microns. As a thickness of the glass ribbon 103 is reduced and approaches 30 microns, the glass ribbon 103 may experience a greater sag than if the glass ribbon 103 comprises a thickness closer to 100 microns. The sag may cause the glass ribbon 103 to curve downwardly under the influence of gravity toward the roller upon which the glass ribbon 103 is supported. However, due to the support rings 307, 309 spaced apart along the length of the rollers (e.g., the third roller 301), the support rings 307, 309 can allow for the glass ribbon 103 to sag while not contacting the rollers and damaging the glass ribbon 103. As such, the catenary apparatus 151 can accommodate a glass ribbon 103 that is thinner (e.g., to about 30 microns in thickness) while limiting the glass ribbon 103 from contacting the rollers.

In some embodiments, the fifth roller 305 that may be positioned between the third roller 301 and the fourth roller 303. The fifth roller 305 can comprise a plurality of roller portions that can facilitate bending and/or breaking of the glass ribbon 103. For example, the fifth roller 305 can comprise a first engagement portion 321 and a second engagement portion 323. The first engagement portion 321 can be attached to a first shaft 327 and the second engagement portion 323 can be attached to a second shaft 329. In some embodiments, the first engagement portion 321 and the second engagement portion 323 may be spaced apart to define an opening 333 between the first engagement portion 321 and the second engagement portion 323. The first engagement portion 321 may be positioned between the opening 333 and the first shaft 327, and the second engagement portion 323 may be positioned between the opening 333 and the second shaft 329. In some embodiments, the first engagement portion 321 may comprise a circular cross-sectional shape that comprises a larger cross-sectional size (e.g., diameter) than a cross-sectional size (e.g., diameter) of the first shaft 327. In some embodiments, the second engagement portion 323 may comprise a circular cross-sectional shape that comprises a larger cross-sectional size (e.g., diameter) than a cross-sectional size (e.g., diameter) of the second shaft 329. In some embodiments, the first engagement portion 321 and the second engagement portion 323 can comprise a diameter that may be within a range from about 5 mm to about 100 mm, or within a range from about 50 mm to about 75 mm.

Figure 4:
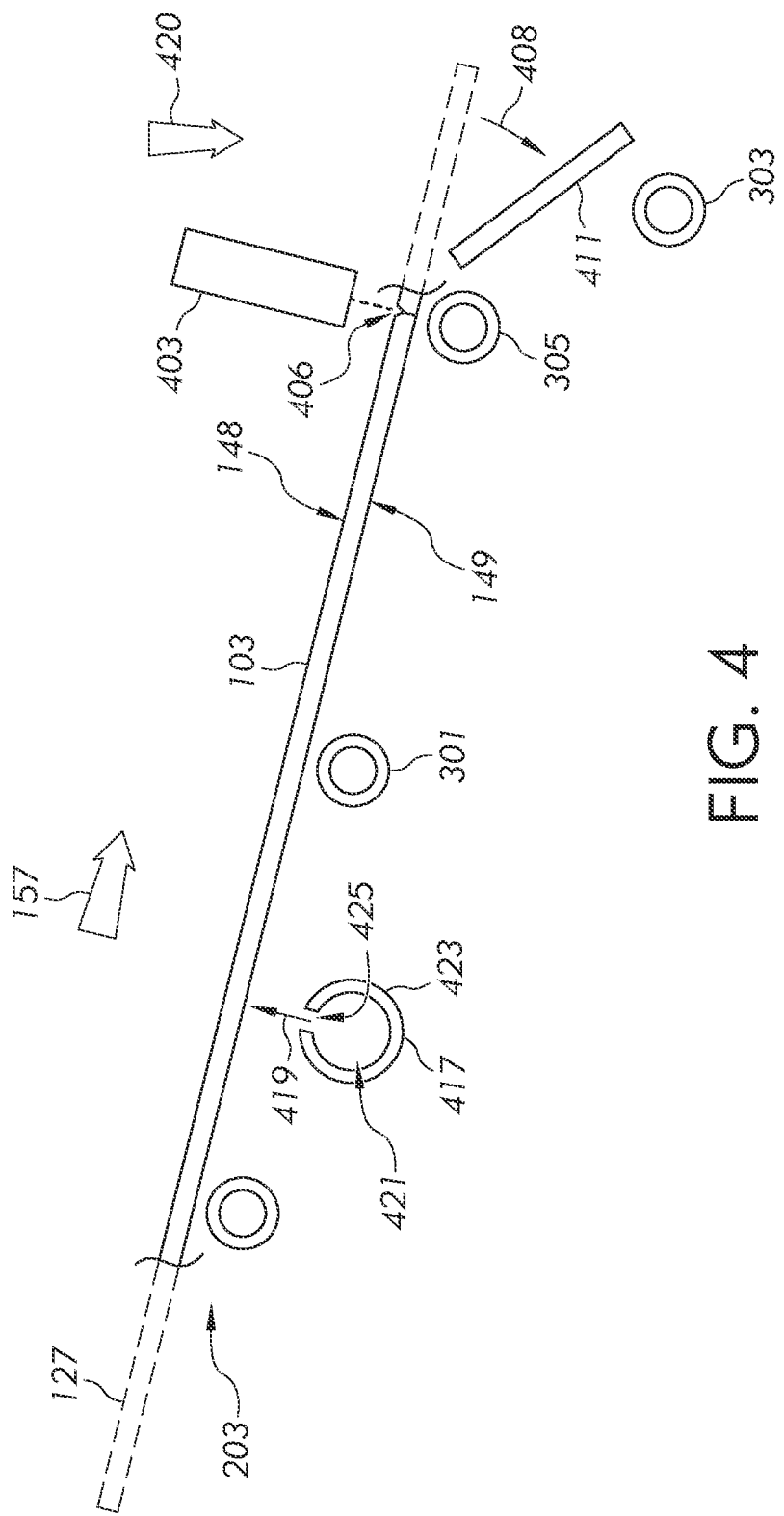
FIG. 4 illustrates a side view of a portion of the catenary apparatus as the glass ribbon is separated in accordance with embodiments of the disclosure.

Referring to FIGS. 3-4, the first engagement portion 321 and the second engagement portion 323 can be positioned to engage the glass ribbon 103. For example, in some embodiments, the first engagement portion 321 and the second engagement portion 323 can contact a first major surface 148 of the glass ribbon 103, while a scoring apparatus 403 can be positioned facing a second major surface 149 of the glass ribbon 103. In some embodiments, the scoring apparatus 403 can be positioned on an opposite side of the travel path (e.g., the third travel path 127) from the plurality of rollers 203. As the glass ribbon 103 travels along the second travel direction 157 and passes the third roller 301, the glass ribbon 103 can move toward the fifth roller 305 and can contact the first engagement portion 321 and the second engagement portion 323. Upon contacting the first engagement portion 321 and the second engagement portion 323, the scoring apparatus 403 can form a score 406 (e.g., a groove, channel, a nick, a mark, score line, etc.) within the second major surface 149. The score 406 can comprise a length (e.g., as measured in the width direction 223 illustrated in FIGS. 2-3) that may be within a range from about 15 mm to about 25 mm, or about 20 mm.

The scoring apparatus 403 can comprise several types of apparatuses that can form the score 406, for example, a laser, a scoring bar, a scoring wheel, etc. The scoring apparatus 403 can be aligned relative to the first engagement portion 321 and the second engagement portion 323 such that the glass ribbon 103 can be sandwiched between the engagement portions 321, 323 and the scoring apparatus 403. As the scoring apparatus 403 forms the score 406, the score 406 can propagate through the glass ribbon 103 along a width of the glass ribbon 103. Upon the score propagating through the glass ribbon 103, a portion of the glass ribbon 103 can separate to form a separated ribbon portion 411. For example, as illustrated in FIG. 4, at a location upstream from the scoring apparatus 403 relative to the second travel direction 157, the glass ribbon 103 may comprise a continuous and unbroken ribbon of glass. The glass ribbon 103 can travel past the scoring apparatus 403, whereupon the scoring apparatus 403 can form the score 406. The separated ribbon portion 411 can fall (e.g., along direction 408) and engage the fourth roller 303. Accordingly, after the score 406 is formed and at a location downstream from the scoring apparatus 403 relative to the second travel direction 157, the score 406 can propagate through the glass ribbon 103 and the separated ribbon portion 411 can separate and detach from the upstream, unbroken portion of the glass ribbon 103. In some embodiments, upon separating from the glass ribbon 103, the separated ribbon portion 411 may fall, due to the force of gravity, and move along a different travel path than the third travel path 127, such that the separated ribbon portion 411 may contact the fourth roller 303. In some embodiments, to further facilitate separation of the separated ribbon portion 411 from the glass ribbon 103, a downwardly inclined vertical airflow can be applied in a flow direction 420 that may be parallel to a gravitational direction. The force of the air flow on the glass ribbon 103 following the application of the score 406 can assist in causing separation of the separated ribbon portion 411.

In some embodiments, the catenary apparatus 151 may not be limited to rollers and, instead, may comprise one or more contactless support apparatuses, for example, an air bearing 417. The air bearing 417 can emit air 419 toward the third travel path 127 of the glass ribbon 103. Due to the impingement of the air 419 upon the glass ribbon 103, the air bearing 417 can support the glass ribbon 103 while not contacting the glass ribbon 103 (e.g., with the glass ribbon 103 spaced a distance apart from the air bearing 417). The air bearing 417 can comprise a hollow interior 421 that can receive air (e.g., pressurized air) from a source. The air bearing 417 can comprise a wall 423 that surrounds the hollow interior 421. In some embodiments, the wall 423 may comprise an opening 425 facing the travel path of the glass ribbon 103. The opening 425 may be in fluid communication with the hollow interior 421 such that the opening 425 can receive the air from the hollow interior 421 and emit the air through the opening 425 toward the glass ribbon 103. While one air bearing 417 is illustrated in FIG. 4, in some embodiments, the catenary apparatus 151 can comprise a plurality of air bearings. For example, the catenary apparatus 151 can comprise a combination of rollers (e.g., one or more rollers 203, 207, 217, 301, 303, 305) and air bearings (e.g., one or more air bearings 417). In some embodiments, the catenary apparatus 151 can comprise rollers (e.g., one or more rollers 203, 207, 217, 301, 303, 305) and zero air bearings, or air bearings and zero rollers (e.g., one or more rollers 203, 207, 217, 301, 303, 305). Accordingly, the glass ribbon 103 can be supported by the catenary apparatus in several ways, for example, with zero or more rollers and/or zero or more air bearings.

Figure 5:
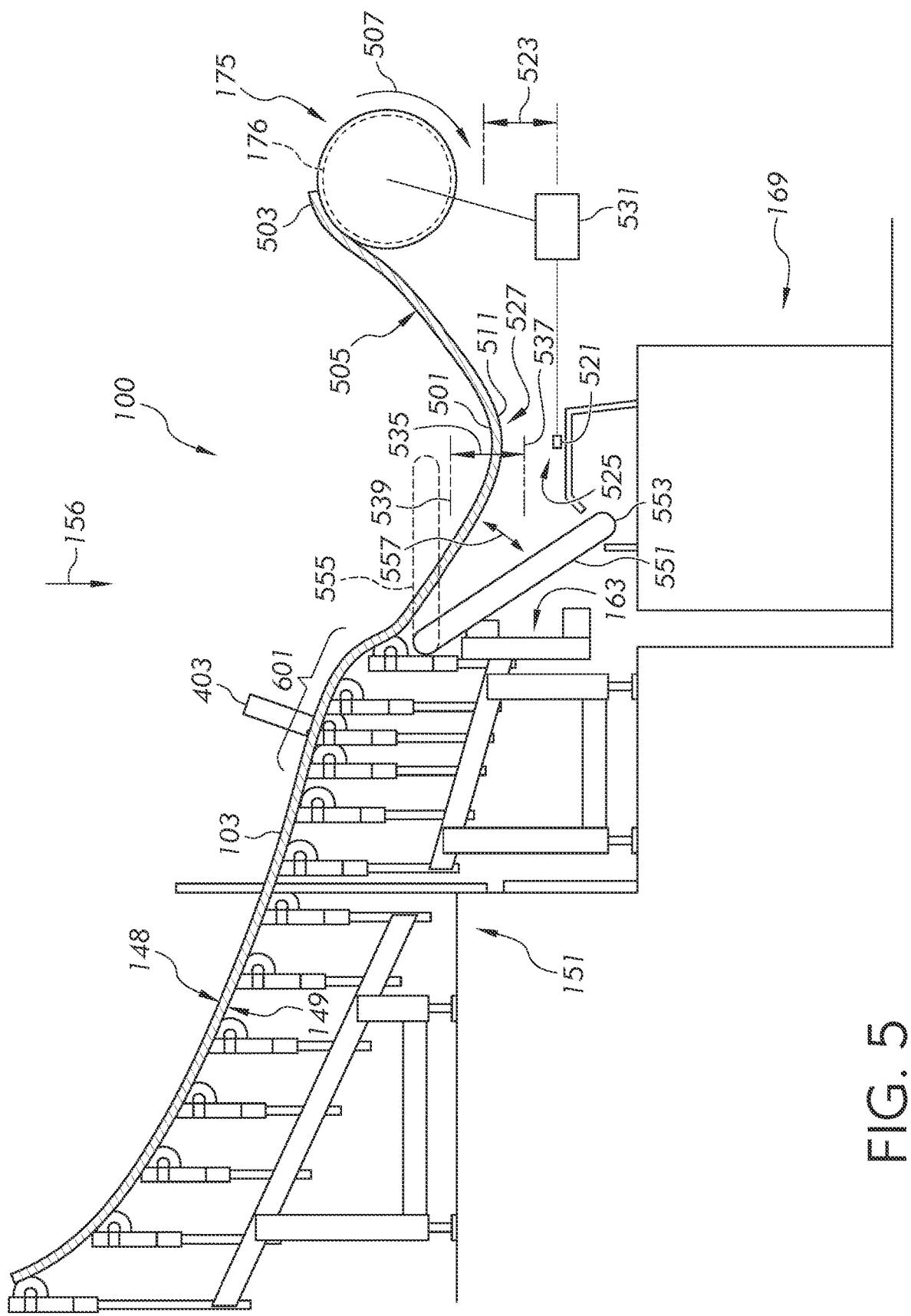
FIG. 5 illustrates a side view of the glass ribbon traveling from the catenary apparatus to a winding apparatus in accordance with embodiments of the disclosure.

Referring to FIG. 5, the glass ribbon 103 can be directed to the winding apparatus 175. For example, instead of cutting and separating the glass ribbon 103 into separated ribbon portions 411 (e.g., illustrated in FIG. 4), the scoring apparatus 403 may not form the score 406 at the second major surface 149 of the glass ribbon 103. As such, without the score 406, the glass ribbon 103 may not be separated into separated ribbon portions 411 and, instead, may remain as a continuous, uninterrupted glass ribbon. As the glass ribbon 103 exits the catenary apparatus 151, methods can comprise directing a first ribbon portion 501 of the glass ribbon 103 to the winding apparatus 175 to wind the first ribbon portion 501 into a roll 503. For example, methods can comprise directing the first ribbon portion 501 of the glass ribbon 103 along a first path portion 505 of the travel path to the winding apparatus 175 to wind the first ribbon portion 501 into the roll 503. The winding apparatus 175 may comprise the spool 176 (e.g., or other circularly-shaped structure) that can rotate in a rotational direction 507. As the winding apparatus 175 rotates in the rotational direction 507, the winding apparatus 175 can receive the first ribbon portion 501 such that the first ribbon portion 501 can be wound around the spool 176. In some embodiments, the winding apparatus 175 can comprise a source of separating material, such as, for example, interleaf paper. The interleaf paper can be wound with the first ribbon portion 501 as the first ribbon portion 501 is wound around the spool 176. In some embodiments, the interleaf paper can separate adjacent layers of the first ribbon portion 501 on the winding apparatus 175. For example, the roll 503 can comprise alternating layers of the first ribbon portion 501 and the interleaf paper, such that the interleaf paper can protect the first ribbon portion 501 from damage.

In some embodiments, the winding apparatus 175 can be spaced a distance apart from the second end 163 of the catenary apparatus 151 such that a gap may exist between the winding apparatus 175 and the catenary apparatus 151. A segment 511 of the first ribbon portion 501 that is upstream from the winding apparatus 175 may be unsupported and spaced a distance from the third disposal apparatus 169. By being unsupported, the segment 511 of the first ribbon portion 501 may not be supported or in contact with the catenary apparatus 151 or the winding apparatus 175. Rather, the segment 511 may be located downstream from the catenary apparatus 151 and upstream from the winding apparatus 175 (e.g., relative to the travel direction of the segment 511) such that the second major surface 149 (e.g., bottom surface relative to the direction of gravity 156) of the segment 511 is not in contact with any structures. In some embodiments, the third disposal apparatus 169 may be located below the gap between the winding apparatus 175 and the catenary apparatus 151. The segment 511 may extend through the gap as the first ribbon portion 501 travels from the catenary apparatus 151 to the winding apparatus 175. In some embodiments, at a location upstream from the gap, the first ribbon portion 501 may be supported by the catenary apparatus 151, and at a location downstream from the gap, the first ribbon portion 501 may be supported by the winding apparatus 175. Within the gap and between the catenary apparatus 151 and the winding apparatus 175, the segment 511 of the first ribbon portion 501 may be unsupported by not contacting a support structure and by hanging freely (e.g., a free loop) under the influence of gravity. By not contacting the floor or the third disposal apparatus 169, damage to the segment 511 may be avoided. Further, by hanging freely, the first ribbon portion 501 may be shielded from the effects of inconsistent speed at which the glass ribbon 103 travels along the catenary apparatus 151 or the rotational speed at which the first ribbon portion 501 is wound onto the spool 176.

In some embodiments, the glass manufacturing apparatus 100 can comprise a sensor 521 that can measure a distance 523 between a location 525 (e.g., within the clean room environment 115 within which the first ribbon portion 501 is located) and the segment 511 (e.g., the unsupported segment) of the first ribbon portion 501. For example, in some embodiments, the distance 523 can comprise a vertical distance (e.g., measured parallel to the direction of gravity 156) between a lower-most point (e.g., lowest location 527) of the segment 511 and the location 525 (e.g., wherein the location 525 may comprise the location of the sensor 521, the location of the third disposal apparatus 169, a floor of the clean room environment 115, etc.). In some embodiments, the sensor 521 can comprise a proximity sensor that can detect the presence and distance of a nearby object (e.g., the segment 511) without physically contacting the segment 511. The sensor 521 can comprise, for example, an optical sensor, an infrared proximity sensor, or any type of sensor that can detect the distance between the sensor 521 and the segment 511. The sensor 521 can be positioned at several locations, for example, on or adjacent to the third disposal apparatus 169 (e.g., as illustrated), on or adjacent to the catenary apparatus 151, etc. In some embodiments, the sensor 521 can be positioned to detect the distance 523 between the location 525 and a lowest location 527 of the segment 511. For example, in some embodiments, the location 525 can be located at a position of the sensor 521, such that the sensor 521 can detect the distance 523 between the sensor 521 and the lowest location 527 of the segment 511. In some embodiments, the location 525 may be located away from the sensor 521. For example, when the sensor 521 is attached to the catenary apparatus 151, the location 525 can be a top of the third disposal apparatus 169, such that the sensor 521 can detect the distance 523 between the lowest location 527 of the segment 511 and the location 525 (e.g., the third disposal apparatus 169). Methods can therefore comprise measuring the distance 523 between the segment 511 of the first ribbon portion 501 and the location 525.

In some embodiments, the glass manufacturing apparatus 100 can comprise a control apparatus 531 (e.g., programmable logic controller, etc.) configured to (e.g., programmed to, encoded to, designed to, made to, etc.) control the movement of the winding apparatus 175. For example, the control apparatus 531 can be connected to the sensor 521 and the winding apparatus 175. In some embodiments, the winding apparatus 175 can comprise a motor that may be mounted to a frame. The motor can comprise a shaft that may be mounted to the spool 176. The motor can cause the shaft to rotate, whereupon rotation of the shaft can cause the spool 176 to likewise rotate (e.g., in the rotational direction 507). The control apparatus 531 can adjust a rotational speed of the winding apparatus 175 based on the distance 523 measured by the sensor 521. For example, by adjusting the rotational speed of the winding apparatus 175, the control apparatus 531 can be connected to the motor of the winding apparatus 175, such that the control apparatus 531 can control the rotational speed of the motor. As such, by controlling the rotational speed of the motor, the rotational speed of the shaft, and, thus, the spool 176, can likewise be controlled by the control apparatus 531. In some embodiments, upon measuring the distance 523, the sensor 521 can transmit distance data related to the distance 523 to the control apparatus 531. The sensor 521 and the control apparatus 531 can be connected via a wired connection, a wireless connection, etc. Upon receiving the distance data from the sensor 521, the control apparatus 531 can adjust the rotational speed of the spool 176 of the winding apparatus 175. For example, the control apparatus 531 can be connected to the motor and/or motor controller of the winding apparatus 175. In some embodiments, the distance 523 measured by the sensor 521 can lie either within or outside of a predetermined range 535. The predetermined range 535 is represented schematically in FIG. 5 with dashed lines due to the predetermined range 535 comprising a height of the segment 511. For example, the predetermined range 535 can lie within a lower-most boundary 537 and an upper-most boundary 539. The lower-most boundary 537 is the lowest desired elevation of the lowest location 527 of the segment 511. The upper-most boundary 539 is the highest desired elevation of the lowest location 527 of the segment 511. In some embodiments, when the sensor 521 detects the distance 523, if the distance 523 is such that the lowest location 527 is below the lower-most boundary 537, then the segment 511 may be outside of the predetermined range 535. In some embodiments, when the sensor 521 detects the distance 523, if the distance 523 is such that the lowest location 527 is above the upper-most boundary 539, then the segment 511 may be outside of the predetermined range 535. Accordingly, when the sensor 521 detects the distance 523, there may be a range of distances that are indicative of the lowest location 527 of the segment 511 lying within the predetermined range 535. Similarly, in some embodiments, the sensor 521 can detect distances 523 that may be indicative of the lowest location 527 of the segment 511 lying outside of the predetermined range 535 (e.g., due to being below the lower-most boundary 537 or above the upper-most boundary 539).

In some embodiments, when the distance 523 is within the predetermined range 535, the control apparatus 531 may not adjust the rotational speed of the winding apparatus 175. For example, due to the distance 523 being within the predetermined range 535, the lowest location 527 of the segment 511 may be at a desired elevation such that the rotational speed at which the winding apparatus 175 is rotating (e.g., and, thus, receiving the first ribbon portion 501) may not be adjusted. In some embodiments, when the distance 523 is outside of the predetermined range 535, methods can comprise adjusting the rotational speed of the winding apparatus 175 when the distance 523 is outside of the predetermined range 535. For example, in some embodiments, the distance 523 may be outside of the predetermined range 535 due to the lowest location 527 being below the lower-most boundary 537. Accordingly, to reduce the risk of the lowest location 527 contacting the third disposal apparatus 169 or other structure, it may be beneficial to raise the lowest location 527 to be above the lower-most boundary 537. Accordingly, the control apparatus 531 can transmit control instructions to the winding apparatus 175 to increase a rotational speed of the winding apparatus 175, which can increase the rate at which the segment 511 is wound onto the spool 176 of the winding apparatus 175. Due to the increased rotational speed of the winding apparatus 175, the lowest location 527 may rise to an elevation that may be above the lower-most boundary 537. In some embodiments, the distance 523 may be outside of the predetermined range 535 due to the lowest location 527 being higher than the upper-most boundary 539. Accordingly, to reduce the risk of excessive stress being applied to the segment 511, it may be beneficial to lower the lowest location 527 to be below the upper-most boundary 539. Accordingly, the control apparatus 531 can transmit control instructions to the winding apparatus 175 to decrease a rotational speed of the winding apparatus 175, which can decrease the rate at which the segment 511 is wound onto the spool 176 of the winding apparatus 175. Due to the decreased rotational speed of the winding apparatus 175, the lowest location 527 may drop to an elevation that may be below the upper-most boundary 539.

In some embodiments, the glass manufacturing apparatus 100 can comprise a conveyor 551 for selectively receiving separated portions of the glass ribbon 103. For example, the conveyor 551 may be located adjacent to the second end 163 of the catenary apparatus 151 and downstream from the catenary apparatus 151. In some embodiments, to facilitate the conveyance of the first ribbon portion 501 to the winding apparatus 175, the conveyor 551 can be movable between a plurality of positions. For example, methods can comprise moving the conveyor 551 between a first position 553 that is outside of the first path portion 505 of the travel path of the first ribbon portion 501 of the glass ribbon 103 and a second position 555 that intersects the first path portion 505 of the travel path. As illustrated in FIG. 5, the first position 553 of the conveyor 551 is illustrated in solid lines while the second position 555 is illustrated in dashed lines, with a movement arrow 557 indicating the movement (e.g., rotation) of the conveyor 551 between the first position 553 and the second position 555. In some embodiments, when an operator desires for the glass ribbon 103 to be wound onto the spool 176 of the winding apparatus 175, the operator may direct the first ribbon portion 501 of the glass ribbon 103 from the catenary apparatus 151, along the first path portion 505, and to the winding apparatus 175. The conveyor 551 can be moved from the second position 555 to the first position 553 such that the conveyor 551 may not intersect the first path portion 505 and, thus, not impede the movement of the first ribbon portion 501 to the winding apparatus 175. Accordingly, the first ribbon portion 501 may be directed to the winding apparatus 175 when the conveyor 551 is in the first position 553.

Figure 6:
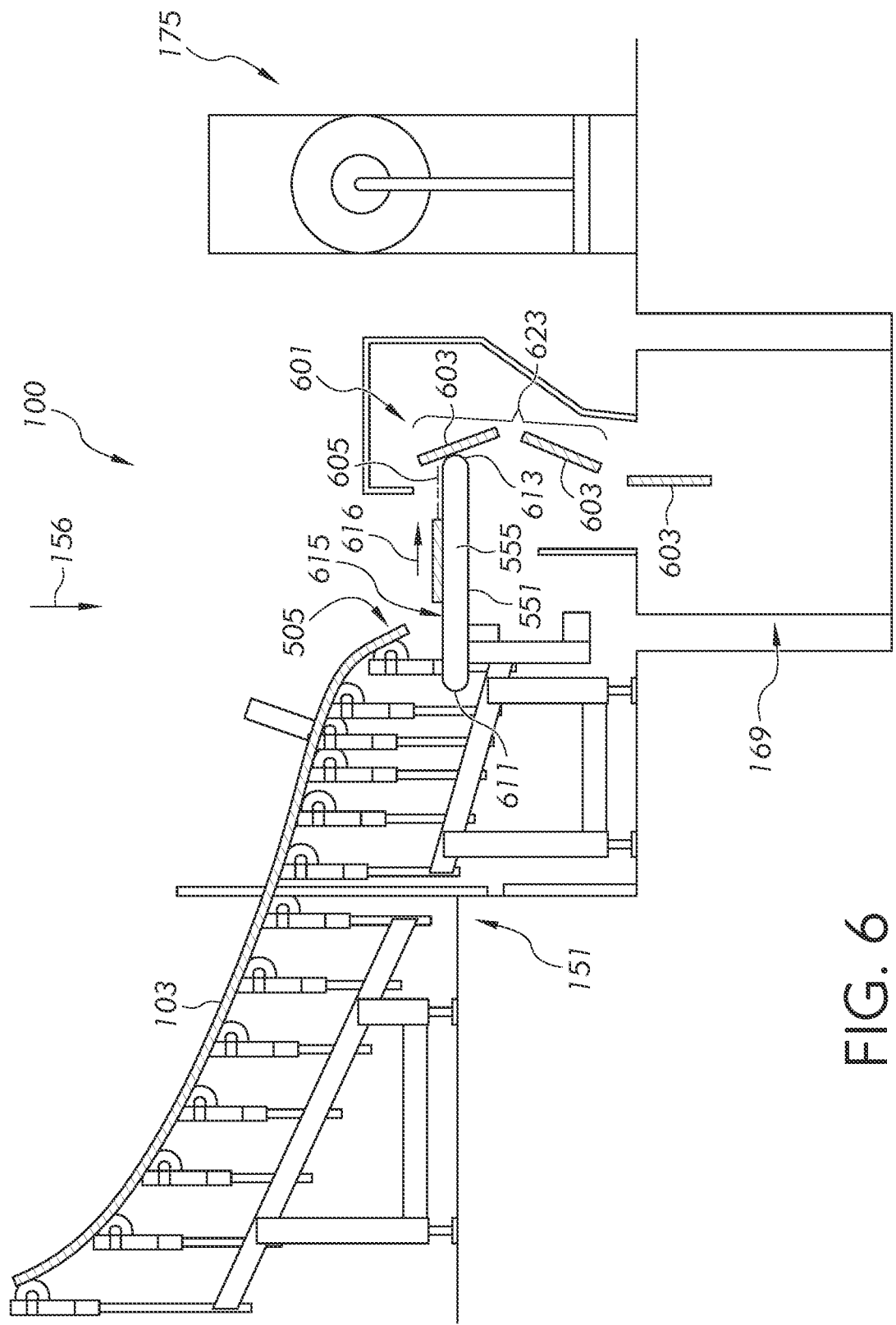
FIG. 6 illustrates a side view of the glass ribbon being separated into a plurality of separated portions and delivered to a conveyor in a second position in accordance with embodiments of the disclosure.

Referring to FIG. 6, in some embodiments, the operator may no longer desire for the glass ribbon 103 to be wound onto the spool 176 of the winding apparatus 175, but, rather, may desire for the glass ribbon 103 to be separated into separated ribbon portions (e.g., the separated ribbon portions 411 of FIG. 4). Methods can comprise moving the conveyor 551 (e.g., along the movement arrow 557 in FIG. 5) from the first position 553 outside the first path portion 505 to the second position 555 intersecting the first path portion 505, to receive a second ribbon portion 601. The second ribbon portion 601 can comprise a different portion of the glass ribbon 103 than the first ribbon portion 501. For example, in some embodiments, the second ribbon portion 601 may be upstream or downstream from the first ribbon portion 501 with zero or more ribbon portions located between the first ribbon portion 501 and the second ribbon portion 601. For example, as illustrated in FIGS. 5-6, the first ribbon portion 501 may be located downstream from the second ribbon portion 601, with the first ribbon portion 501 directed toward the winding apparatus 175 and the second ribbon portion 601 directed to the conveyor 551. In some embodiments, methods can comprise detaching the first ribbon portion 501 from the second ribbon portion 601 of the glass ribbon 103. The detachment can occur, for example, as a result of the scoring apparatus 403 (e.g., illustrated in FIG. 4) forming the score 406 in the glass ribbon 103 between the first ribbon portion 501 and the second ribbon portion 601, such that as the score 406 is formed, the first ribbon portion 501 may separate from the second ribbon portion 601 as the first ribbon portion 501 travels past the fifth roller 305.

Referring to FIG. 6, in some embodiments, following the separation of the first ribbon portion 501 and the second ribbon portion 601, the conveyor 551 can receive a plurality of separated ribbon portions 603 of the second ribbon portion 601 of the glass ribbon 103 from the catenary apparatus 151 and move the plurality of separated ribbon portions 603 along a second path portion 605 of the travel path. Methods can comprise separating the second ribbon portion 601 into the plurality of separated ribbon portions 603. For example, the second ribbon portion 601 can be separated into the plurality of separated ribbon portions 603 as described relative to FIGS. 3-4. The scoring apparatus 403 can form the score 406 at the fifth roller 305 causing the score 406 to propagate through the glass ribbon 103, thereby separating the separated ribbon portion 411 from the upstream glass ribbon 103. As illustrated in FIG. 6, the separation process can be repeated such that the plurality of separated ribbon portions 603 can be formed. In some embodiments, the conveyor 551 can extend between a first end 611 and a second end 613, with the first end 611 positioned adjacent to the catenary apparatus 151. In some embodiments, the conveyor 551 can comprise a support surface 615 that can receive the plurality of separated ribbon portions 603. Methods can comprise delivering the plurality of separated ribbon portions 603 to the conveyor 551 when the conveyor 551 is in the second position 555 and moving the plurality of separated ribbon portions 603 toward the second end 613 of the conveyor 551. For example, the plurality of separated ribbon portions 603 can pass from the catenary apparatus 151 to the first end 611 of the conveyor 551, whereupon the plurality of separated ribbon portions 603 may be received on the support surface 615. In some embodiments, the support surface 615 may be movable, for example, due to the conveyor 551 comprising mechanical structures such as motors, gears, etc. The support surface 615 may be movable in a travel direction 616 from the first end 611 toward the second end 613, such that the plurality of separated ribbon portions 603 can be conveyed along the second path portion 605 from the first end 611 toward the second end 613.

In some embodiments, a speed at which the support surface 615 moves may be faster than the speed of the glass ribbon 103 moving along the catenary apparatus 151. For example, the speed at which the support surface 615 moves may be within a range from about 20% to about 30% faster than the speed of the glass ribbon 103 as the glass ribbon 103 travels along the catenary apparatus 151. As such, when a separated ribbon portion of the plurality of separated ribbon portions 603 is received by the conveyor 551, the separated ribbon portion may be moved toward the second end 613 at a speed that is faster than the next, upstream separated ribbon portion is moved along the catenary apparatus 151. Accordingly, the likelihood of one separated ribbon portion contacting another separated ribbon portion and, thus, causing damage to one, or both, of the separated ribbon portions, may be reduced.

In some embodiments, methods can comprise directing a first set 623 of the plurality of separated ribbon portions 603 from the conveyor 551 toward the third disposal apparatus 169 to crush the first set 623 of the plurality of separated ribbon portions 603. For example, the third disposal apparatus 169 may be positioned downstream from the conveyor 551 and below the second end 613 of the conveyor 551. The third disposal apparatus 169 can therefore receive the first set 623 of the plurality of separated ribbon portions 603 from the conveyor 551 and crush the first set 623 of the plurality of separated ribbon portions 603. In some embodiments, the third disposal apparatus 169 can be positioned adjacent to the second end 613 of the conveyor such that the first set 623 of the plurality of separated ribbon portions 603 may be directed from the second end 613 and into the third disposal apparatus 169 by falling from the second end 613 under the influence of gravity. The first set 623 of the plurality of separated ribbon portions 603 can comprise some, or all, of the plurality of separated ribbon portions 603. For example, in some embodiments, the first set 623 can comprise a portion of (e.g., less than all) of the plurality of separated ribbon portions 603, such that a second set (e.g., illustrated in FIG. 8) of the plurality of separated ribbon portions 603 may not be directed into the third disposal apparatus 169. Rather, in some embodiments and as illustrated in FIG. 8, the second set may be collected, stored, and/or stacked.

Figure 7:
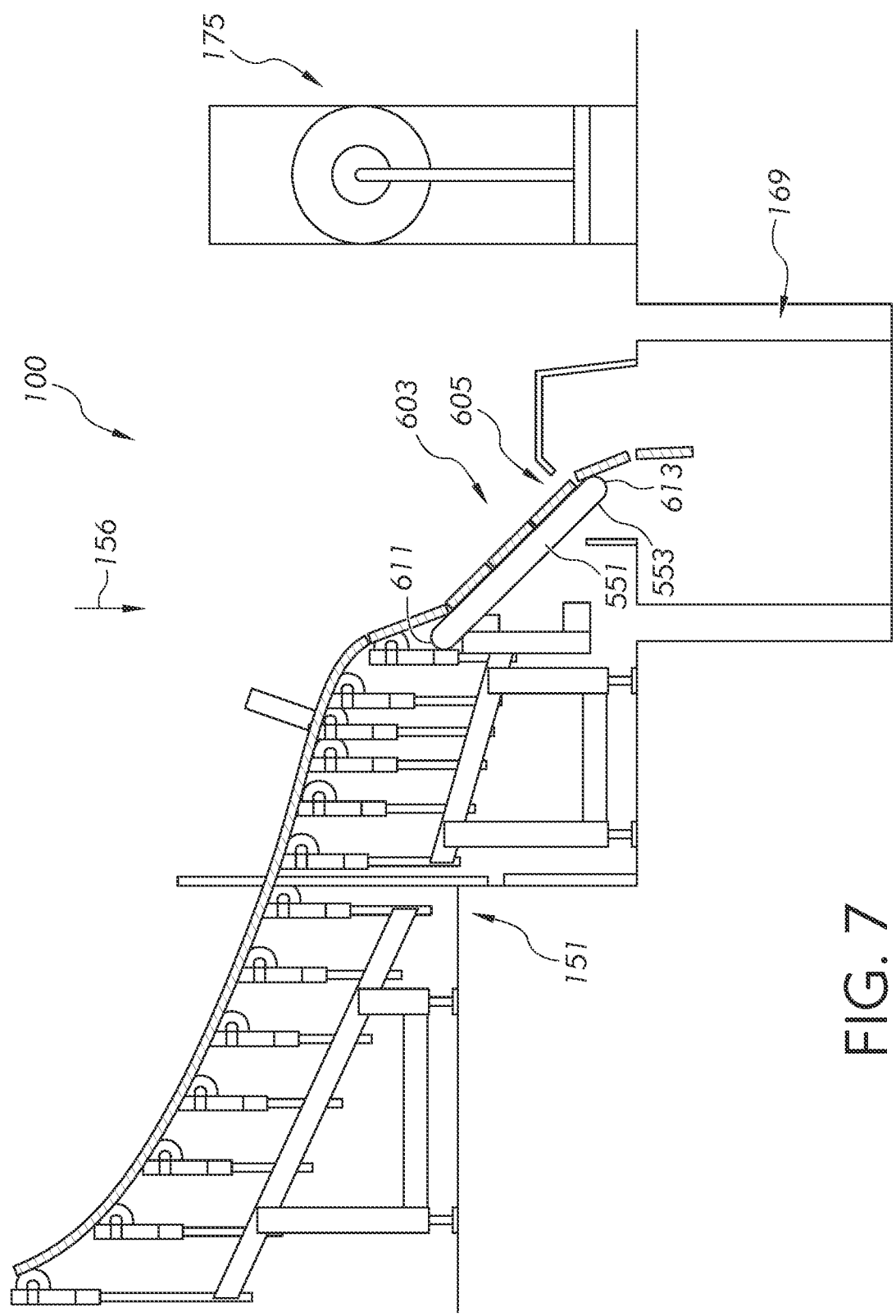
FIG. 7 illustrates a side view of the glass ribbon being separated into a plurality of separated portions and delivered to a conveyor in a first position in accordance with embodiments of the disclosure.

Referring to FIG. 7, in some embodiments, the conveyor 551 may be in the first position 553 or the second position 555 when receiving the plurality of separated ribbon portions 603 from the catenary apparatus 151. For example, methods can comprise delivering the plurality of separated ribbon portions 603 to the conveyor 551 when the conveyor 551 is in the first position 553 and moving the plurality of separated ribbon portions 603 toward the second end 613 of the conveyor 551. While the conveyor 551 may be in the second position 555 upon receiving the plurality of separated ribbon portions 603 and delivering the plurality of separated ribbon portions 603 to the third disposal apparatus 169, the conveyor 551 is not limited to such a position. Rather, in some embodiments, the conveyor 551 can be in the first position 553 when receiving the plurality of separated ribbon portions 603. With the conveyor 551 in the first position 553, the first end 611 of the conveyor 551 can receive the plurality of separated ribbon portions 603 from the catenary apparatus 151 and move the plurality of separated ribbon portions 603 along the second path portion 605 of the travel path. As the plurality of separated ribbon portions 603 reach the second end 613, the plurality of separated ribbon portions 603 can fall from the conveyor 551 into the third disposal apparatus 169.

Figure 8:
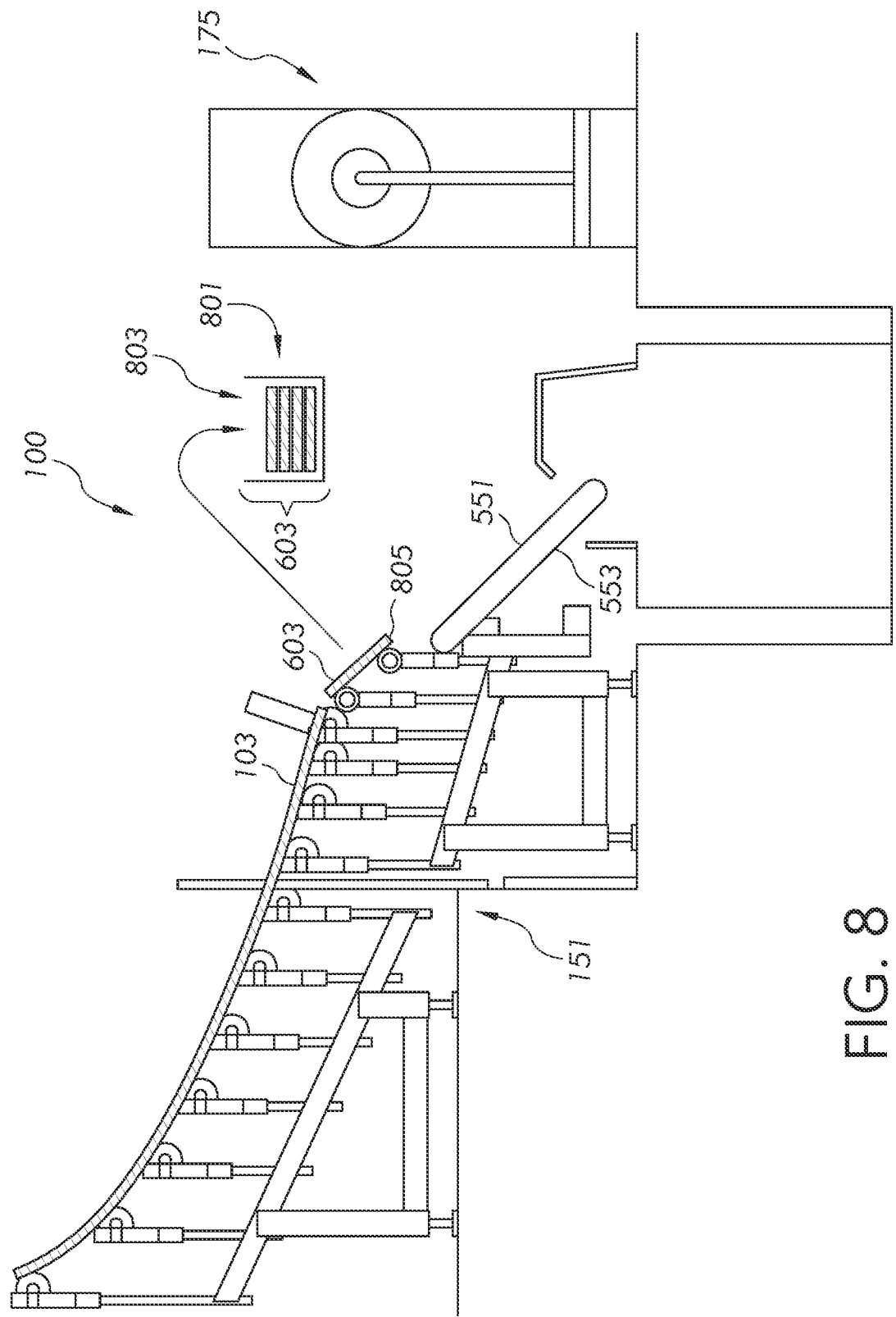
FIG. 8 illustrates a side view of the glass ribbon being separated into a plurality of separated portions and collected to form a stack of separated portions in accordance with embodiments of the disclosure.

Referring to FIG. 8, in some embodiments, methods can comprise forming a stack 801 with a second set 803 of the plurality of separated ribbon portions 603. For example, the conveyor 551 can be moved to the first position 553 and the scoring apparatus 403 can separate the glass ribbon 103 into the plurality of separated ribbon portions 603. In some embodiments, the first set 623 can be conveyed to the third disposal apparatus 169 for crushing. In some embodiments, an operator may collect and store the second set 803 of the plurality of separated ribbon portions 603. For example, following the separation of a separated ribbon portion 805 from the upstream glass ribbon 103, the separated ribbon portion 805 can be collected prior to the separated ribbon portion 805 being received by and/or contacting the conveyor 551. For example, in some embodiments, an operator who is in proximity to the catenary apparatus 151 can grip and hold the separated ribbon portion 805 as the separated ribbon portion 805 is separating from the upstream glass ribbon 103. The operator can then collect the separated ribbon portion 805, for example, by forming the stack 801 of separated ribbon portions. In some embodiments, the glass manufacturing apparatus 100 can comprise a gripping apparatus that can receive and grip the separated ribbon portion 805 after the separation has occurred. As such, whether received by an operator or by a gripping apparatus, the separated ribbon portion 805 may not contact the conveyor 551, such that the likelihood of damage to the separated ribbon portion 805 caused by the conveyor 551 may be avoided. In some embodiments, by positioning the conveyor 551 in the first position 553, the conveyor 551 may not interfere with the collection of the separated ribbon portion 805, for example, by being within the path of the separated ribbon portion 805.

The glass manufacturing apparatus 100 can yield several benefits. For example, the glass ribbon 103 can be directed along a plurality of paths for a plurality of outcomes. In some embodiments, the glass ribbon 103 can be wound into a roll, collected as a plurality of separated ribbon portions, crushed, or inspected. The glass ribbon 103 can initially be directed into the clean room environment 115, wherein a level of particles in the air may be reduced to avoid damage to the glass ribbon 103. In addition, the glass manufacturing apparatus 100 can comprise the catenary apparatus 151 that may comprise the plurality of rollers (or air bearings). The angle formed by the catenary apparatus 151 can limit stress applied to the glass ribbon 103, while supporting the glass ribbon on the elastomeric support rings 307, 309. Due to the thickness (e.g., within a range from about 30 microns to about 100 microns) of the glass ribbon 103, the glass ribbon 103 may experience sag. However, the support rings 307, 309 can support the glass ribbon 103 a distance apart from the rollers, thus limiting contact between the glass ribbon 103 and the rollers. In addition, the glass ribbon 103 can travel along a plurality of paths after exiting the catenary apparatus 151. For example, the glass ribbon 103 can be wound onto the spool 176 of the winding apparatus 175, wherein the glass ribbon 103 can be stored as a roll. In some embodiments, the glass ribbon 103 can be separated (e.g., with the scoring apparatus 403) into separated ribbon portions, whereupon the glass ribbon 103 can either be collected and stacked or delivered to a disposal apparatus.

It should be understood that while various embodiments have been described in detail relative to certain illustrative and specific examples thereof, the present disclosure should not be considered limited to such, as numerous modifications and combinations of the disclosed features are possible without departing from the scope of the following claims.

What is claimed:

1. A method for manufacturing a glass ribbon comprising:
   moving the glass ribbon along a travel path in a travel direction;

directing a first ribbon portion of the glass ribbon to a winding apparatus to wind the first ribbon portion into a roll;

detaching the first ribbon portion from a second ribbon portion of the glass ribbon;

separating the second ribbon portion into a plurality of separated ribbon portions;

directing a first set of the plurality of separated ribbon portions toward a disposal apparatus to crush the first set of the plurality of separated ribbon portions;

forming a stack with a second set of the plurality of separated ribbon portions;

moving a conveyor between a first position outside the travel path of the glass ribbon and a second position intersecting the travel path, wherein the first ribbon portion is directed to the winding apparatus when the conveyor is in the first position, wherein a segment of the first ribbon portion upstream from the winding apparatus is unsupported and spaced a distance from the disposal apparatus when the conveyor is in the first position;

measuring a distance between the segment of the first ribbon portion and a location within a clean room environment within which the first ribbon portion is located; and adjusting a rotational speed of the winding apparatus when the distance is outside of a predetermined range.

2. The method of claim 1, further comprising delivering the plurality of separated ribbon portions to the conveyor when the conveyor is in the second position and moving the plurality of separated ribbon portions toward an end of the conveyor.

3. The method of claim 2, wherein the disposal apparatus is positioned adjacent to the end of the conveyor such that the first set of the plurality of separated ribbon portions are directed from the end into the disposal apparatus.

4. The method of claim 1, wherein the directing the first ribbon portion comprises supporting the first ribbon portion with a curved surface of a catenary apparatus, and the first ribbon portion having a thickness from greater than or equal to 30 micrometers to less than or equal to 100 micrometers.

5. The method of claim 1, wherein the directing the first ribbon comprises engaging a first major surface of the first ribbon with a support roller and engaging a second major surface of the first ribbon opposite the first major surface with a catenary apparatus.

6. The method of claim 5, wherein the second catenary apparatus engages the second major surface a location downstream from where the support roller engages the first major surface.

7. The method of claim 5, wherein the support roller engages the first major surface by emitting air towards the first major surface of the glass ribbon.

8. A method for manufacturing a glass ribbon comprising:
moving the glass ribbon along a travel path in a travel direction;
directing a first ribbon portion of the glass ribbon to a winding apparatus to wind the first ribbon portion into a roll;
detaching the first ribbon portion from a second ribbon portion of the glass ribbon;
separating the second ribbon portion into a plurality of separated ribbon portions;
directing a first set of the plurality of separated ribbon portions toward a disposal apparatus to crush the first set of the plurality of separated ribbon portions; and
forming a stack with a second set of the plurality of separated ribbon portions,
wherein the directing the first ribbon comprises engaging a first major surface of the first ribbon with a support roller and engaging a second major surface of the first ribbon opposite the first major surface with a catenary apparatus
wherein the catenary apparatus engages the second major surface through a plurality of support rings extending circumferentially around an outer surface of a plurality of rollers of the catenary apparatus, a first support ring and a second support ring of the plurality of support rings extend circumferentially around a roller of the plurality of rollers where the first support ring is spaced apart from the second support ring along the roller.

9. A method for manufacturing a glass ribbon comprising:
moving the glass ribbon along a travel path in a travel direction;
directing a first ribbon portion of the glass ribbon along a first path portion of the travel path to a winding apparatus to wind the first ribbon portion into a roll;
detaching the first ribbon portion from a second ribbon portion of the glass ribbon;
moving a conveyor from a first position outside the first path portion to a second position intersecting the first path portion, to receive the second ribbon portion;
separating the second ribbon portion into a plurality of separated ribbon portions;
delivering the plurality of separated ribbon portions to the conveyor, and
directing a first set of the plurality of separated ribbon portions from the conveyor toward a disposal apparatus,
wherein the first ribbon portion is directed to the winding apparatus when the conveyor is in the first position,
wherein a segment of the first ribbon portion upstream from the winding apparatus is unsupported and spaced a distance from the disposal apparatus when the conveyor is in the first position, and
wherein a glass manufacturing apparatus comprises:
a forming apparatus configured to form the glass ribbon;
a catenary apparatus positioned downstream from the forming apparatus and comprising a curved surface, the curved surface comprising the travel path along which the glass ribbon is conveyed in the travel direction;
the winding apparatus positioned downstream from the catenary apparatus and configured to wind the first ribbon portion of the glass ribbon into the roll; and
the conveyor positioned downstream from the catenary apparatus and configured to receive the plurality of separated ribbon portions of the second ribbon portion of the glass ribbon from the catenary apparatus and move the plurality of separated ribbon portions along a portion of the travel path.

10. The method of claim 9, further comprising forming a stack with a second set of the plurality of separated ribbon portions.

* * * * *